United States Patent
Miwa et al.

(10) Patent No.: US 8,577,494 B2
(45) Date of Patent: Nov. 5, 2013

(54) SEMICONDUCTOR MANUFACTURING APPARATUS AND CONTROL SYSTEM AND CONTROL METHOD THEREFOR

(75) Inventors: Kazuhiro Miwa, Fukushima-ken (JP); Kazuhiro Watanabe, Fukushima-ken (JP); Akito Mifune, Fukushima-ken (JP)

(73) Assignee: Spansion LLC, Sunnyvale, CA (US)

( * ) Notice: Subject to any disclaimer, the term of this patent is extended or adjusted under 35 U.S.C. 154(b) by 0 days.

(21) Appl. No.: 13/020,692

(22) Filed: Feb. 3, 2011

(65) Prior Publication Data

US 2011/0130861 A1 Jun. 2, 2011

Related U.S. Application Data

(63) Continuation of application No. 11/636,064, filed on Dec. 6, 2006, now Pat. No. 7,908,025, which is a continuation-in-part of application No. PCT/JP2005/022572, filed on Dec. 8, 2005.

(51) Int. Cl.
*G06F 19/00* (2011.01)

(52) U.S. Cl.
USPC .............................. 700/121; 700/29; 700/32

(58) Field of Classification Search
USPC .................... 700/28–29, 32, 96, 108, 121
See application file for complete search history.

(56) References Cited

U.S. PATENT DOCUMENTS

| 6,061,640 | A | 5/2000 | Tanaka et al. |
| 2004/0197938 | A1 | 10/2004 | Saito |
| 2005/0245170 | A1 | 11/2005 | Swedek et al. |
| 2007/0095788 | A1* | 5/2007 | Hoffman et al. ................. 216/59 |
| 2009/0005894 | A1 | 1/2009 | Bomholt et al. |

FOREIGN PATENT DOCUMENTS

| JP | 10135091 | | 5/1998 |
| JP | 2003197609 | A | 7/2003 |
| JP | 2003229362 | A | 8/2003 |
| JP | 2004085216 | A | 3/2004 |
| JP | 2004153224 | A | 5/2004 |
| JP | 2004527117 | A | 9/2004 |

OTHER PUBLICATIONS

English Translation of Abstract for JP 2003-229362 (A), Aug. 15, 2003, 2 pps.
English Translation of Abstract for JP 2004-153224 (A), May 27, 2004, 2 pps.
English Translation of Abstract for JP 10-135091 (A), May 22, 1998, 2 pps.

* cited by examiner

*Primary Examiner* — Mohammad Ali
*Assistant Examiner* — Nathan Laughlin (57) ABSTRACT

Disclosed herein is technology for, among other things, a semiconductor manufacturing apparatus, and a control system and a control method therefor, by which a target parameter that is measured from a wafer processed with a plurality of processing parameters that are processing conditions of the semiconductor manufacturing apparatus to process a wafer, a multiple classification analysis is performed with the plurality of processing parameters and the target parameter to calculate a model formula expressing the target parameter in a selected parameter, a predicted value of the target parameter of the wafer being processed by use of the model formula is calculated, while the processing is being performed, the processing parameters of the processing is modified on the basis of the predicted value, and the processing is continuously performed.

22 Claims, 8 Drawing Sheets

SEMICONDUCTOR MANUFACTURING APPARATUS AND CONTROL SYSTEM AND CONTROL METHOD THEREFOR

CROSS-REFERENCES TO RELATED APPLICATIONS

This application is a continuation of U.S. patent application Ser. No. 11/636,064, filed Dec. 6, 2006, which is a continuation in part of International Application No. PCT/JP2005/022572, filed Dec. 08, 2005 which was not published in English under PCT Article 21(2).

FIELD OF THE INVENTION

This invention relates generally to semiconductors and control systems and control methods therefor.

BACKGROUND OF THE INVENTION

In fabricating semiconductor devices, steps of processes are performed on a wafer of a semiconductor substrate by use of a number of semiconductor manufacturing apparatuses. Such processes include, for example, the thin film formation on the wafer, etching process of the wafer or the thin film on the wafer, implantation of impurities, thermal treatment, exposure and development, and the like. Through the use of semiconductor manufacturing apparatuses in wafer processes, the wafer is processed with multiple processing parameters such as processing conditions. Such a processed wafer needs to have target parameters, which are physically, optically, or electrically measured from the processed wafer, within desired ranges. The yield of the semiconductor devices can be maintained by keeping the target parameters of the wafer within the desired ranges, thereby enabling the production costs to be reduced.

Japanese Patent Application Publication No. 6-4789 discloses an error monitoring method in which characteristics of the apparatus to be monitored or neighboring equipment thereof are detected, multiple regression analysis is performed on the characteristics, and the regression coefficient is judged as to whether it lies within a given normal range. If the regression coefficient does not lie within the given normal range, it is determined that an error has occurred in the apparatus.

As a method of making the target parameters lie within a desired range, one or more of the processing parameters of the semiconductor manufacturing apparatus are modified prior to the wafer processing, based on the target parameters measured from another wafer. The processing parameters, however, have variations in a short range. Even with the aforedescribed method, the desired target parameters are not always obtainable. While one process is being performed, there are, for example, ten to hundred processing parameters of the semiconductor manufacturing apparatus. For this reason, keeping the target parameter within a desired range proves difficult.

SUMMARY OF THE INVENTION

The present invention has been made in view of the above circumstances and provides a semiconductor manufacturing apparatus, a control system and a control method therefor, by which a target parameter of a wafer processed by use of the semiconductor manufacturing apparatus can be kept within a desired range.

According to a first aspect of the present invention, there is provided a method of controlling a semiconductor manufacturing apparatus including: obtaining a plurality of processing parameters that are processing conditions of the semiconductor manufacturing apparatus to process a wafer; obtaining a target parameter that is measured from the wafer processed with the plurality of processing parameters; performing a multiple classification analysis with the plurality of processing parameters and the target parameter to calculate a model formula expressing the target parameter in a selected parameter that is one or more of the plurality of processing parameters; obtaining the selected parameter of a processing while the processing is being performed by the semiconductor manufacturing apparatus; calculating a predicted value of the target parameter of the wafer being processed by use of the model formula and the selected parameter, while the processing is being performed; calculating a value to be modified of a modification parameter, the modification parameter being one or more of the plurality of processing parameters of the processing being performed by the semiconductor manufacturing apparatus on the basis of the predicted value, while the processing is being performed; and performing the processing continuously by use of the value to be modified of the modification parameter. While the process is being performed by use of the semiconductor manufacturing apparatus, the predicted value of the target parameter is calculated and the modification parameter out of the processing parameters is modified to continue the processing. This can reduce the variation of the target parameter because of a changing factor at short range, thereby providing the control method of the semiconductor device in which the target parameter can be kept within a desired range.

According to a second aspect of the present invention, there is provided a controlling system of a semiconductor manufacturing apparatus including: a processing portion processing a wafer; a first parameter obtaining portion obtaining a plurality of processing parameters that are processing conditions of the processing portion in processing the wafer; a target parameter obtaining portion obtaining a target parameter that is measured from the wafer processed with the plurality of processing parameters; a model formula calculating portion calculating a model formula expressing the target parameter in a selected parameter that is one or more of the plurality of processing parameters by performing a multiple classification analysis with the plurality of processing parameters and the target parameter; a second parameter obtaining portion obtaining the selected parameter by the processing portion, while a processing is being performed by the processing portion; a predicted value calculating portion calculating a predicted value of the target parameter of the wafer being processed with the model formula and the selected parameter, while the processing is being performed; and a modification parameter calculating portion calculating a value of a modification parameter to be modified based on the predicted value, the modification parameter being one or more of the plurality of processing parameters of the processing being performed by the processing portion, while the processing is being performed. The processing portion performs the processing continuously by use of the value of the modification parameter to be modified. It is possible to provide the control system of the semiconductor manufacturing apparatus, by which the target parameter can be maintained within a desired range.

According to a third aspect of the present invention, there is provided a semiconductor manufacturing apparatus including: a processing portion processing a wafer; a second parameter obtaining portion obtaining a selected parameter, which is one or more of a plurality of processing parameters that are processing conditions of the processing portion, while a processing is being performed by the processing portion; a predicted value calculating portion calculating a predicted value of a target parameter of the wafer being processed with a model formula and the selected parameter, the model formula expressing in the target parameter measured from the wafer processed by the processing portion, while the processing is being performed; and a modification parameter calculating portion calculating a value of a modification parameter to be modified on the basis of the predicted value, the modification parameter being one or more of the plurality of processing parameters of the processing being performed by the processing portion, while the processing is being performed. The processing portion performs the processing continuously by use of the value of the modification parameter to be modified. It is possible to provide the semiconductor manufacturing apparatus, by which the target parameter can be maintained within a desired range.

According to a fourth aspect of the present invention, there is provided a method of controlling a semiconductor manufacturing apparatus including: calculating a multicollinearity of first parameters that are processing conditions to process a wafer by use of the semiconductor manufacturing apparatus to set to second parameters, the first parameters except a parameter having more than a given value of the multicollinearity; calculating correlation coefficients between the second parameters and a target parameter that is measured from the wafer processed with the first parameters by use of the semiconductor manufacturing apparatus to set to a third parameter, a given number of the second parameters in descending order of the correlation coefficients; calculating partial correlation coefficients between the third parameter and the second parameters to set to a fourth parameter, a given number of the second parameters in descending order of the partial correlation coefficients; and performing a multiple regression analysis between the third parameter and the fourth parameter and the target parameter to calculate the model formula expressing the target parameter in the third parameter and the forth parameter. It is possible to calculate the model formula, by which the target parameter can be calculated with accuracy from the processing parameters.

DESCRIPTION OF THE PREFERRED EMBODIMENTS

A description will now be given, with reference to the accompanying drawings, of embodiments of the present invention.

One embodiment is an example of a control system and a control method of a semiconductor manufacturing apparatus, in which an etching apparatus is employed for the semiconductor manufacturing apparatus, the etching process is performed on the wafer, and the target parameter is the etching amount, in accordance with various embodiments of the present invention. In one embodiment, an etching apparatus 10 is used for etching a silicon substrate, and the etching amount is an amount for forming the trench isolation region during Shallow Trench Isolation (STI), by which elements are isolated by etching the silicon substrate. Etching parameters of the processing parameters include, in a model formula: DC bias applied to a lower electrode of the etching apparatus 10; He leak amount at the time of chucking the wafer; capacitor value in a matching circuit of RF power; and an etching time.

Figure 1:
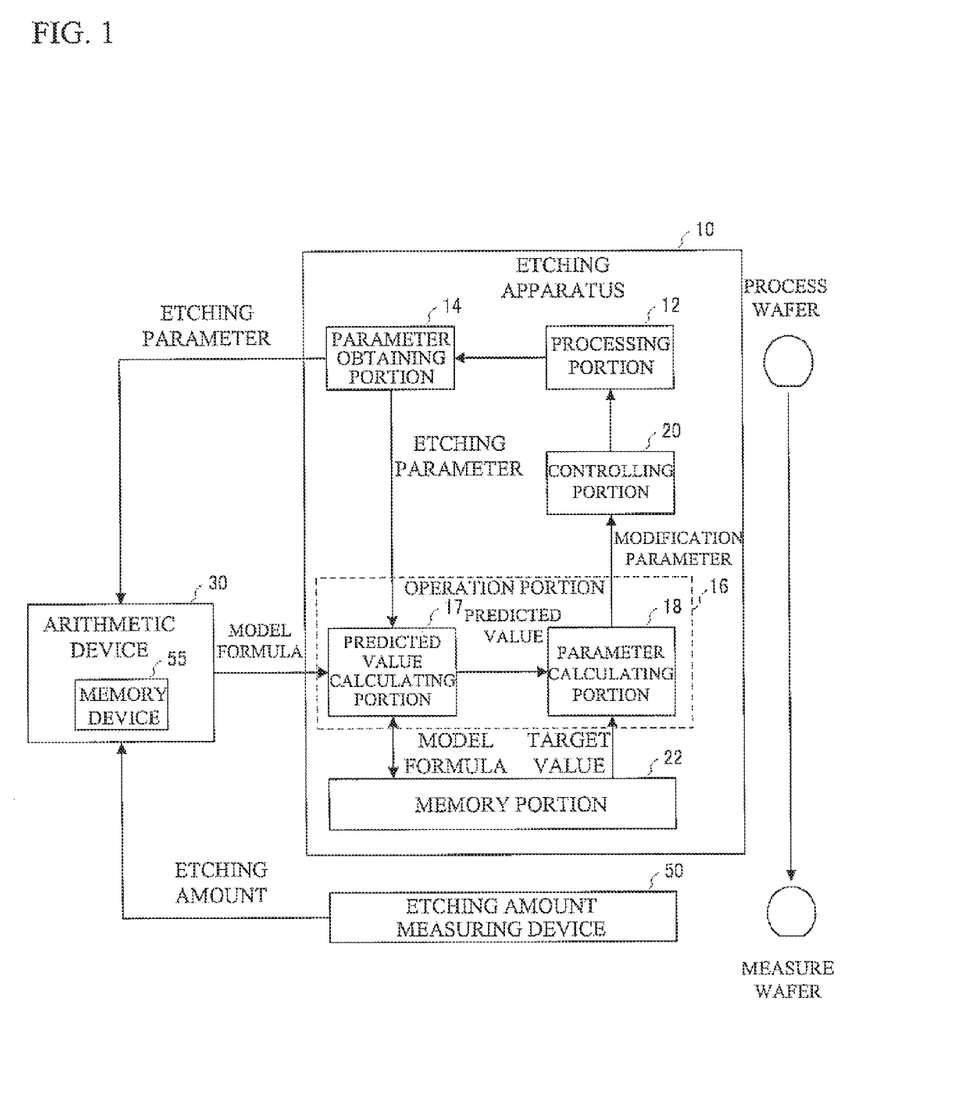
FIG. 1 is a block diagram of a control system of a semiconductor manufacturing apparatus in accordance with an embodiment of the present invention.

FIG. 1 is a block diagram of a control system of the semiconductor manufacturing apparatus in accordance with an embodiment of the present invention. The etching apparatus 10 may include: a processing portion 12 that performs the etching process on the wafer; a parameter obtaining portion 14 that obtains etching parameters that are processing conditions of the etching process performed by the processing portion 12; a controlling portion 20 that controls the etching parameters during the etching process performed by the processing portion 12; an operation portion 16; and a memory portion 22. The operation portion 16 may include: a predicted value calculating portion 17; and a parameter calculating portion 18. In one embodiment, the parameter obtaining portion 14 outputs the etching parameters to an arithmetic device 30. The model formula is input from the arithmetic device 30 to the operation portion 16 and stored in the memory portion 22.

In one embodiment, an etching amount measuring device 50 measures the etching amount from the wafer on which the etching process has been performed by the etching apparatus 10. The etching amount measuring device 50 measures the etching amount by, for example, measuring the step between the region that has been etched and the region that is not etched, in the wafer. The etching amount measuring device 50 may then output the etching amount to the arithmetic device 30. Here, the etching amount may be measured immediately after the processing portion 12 performs the etching process or after another semiconductor manufacturing apparatus performs another process.

The arithmetic device 30 may be, for example, a computer equipped with a memory device 55 such as a hard disk, optical storage medium, or the like. The arithmetic device 30 stores, in the memory device 55, the etching parameters and the etching amounts supplied from the etching apparatus 10 and the etching amount measuring device 50. The arithmetic device 30, as will be described later, calculates the model formula with the etching parameters and the etching amounts to output to the operation portion 16 of the etching apparatus.

Figure 2:
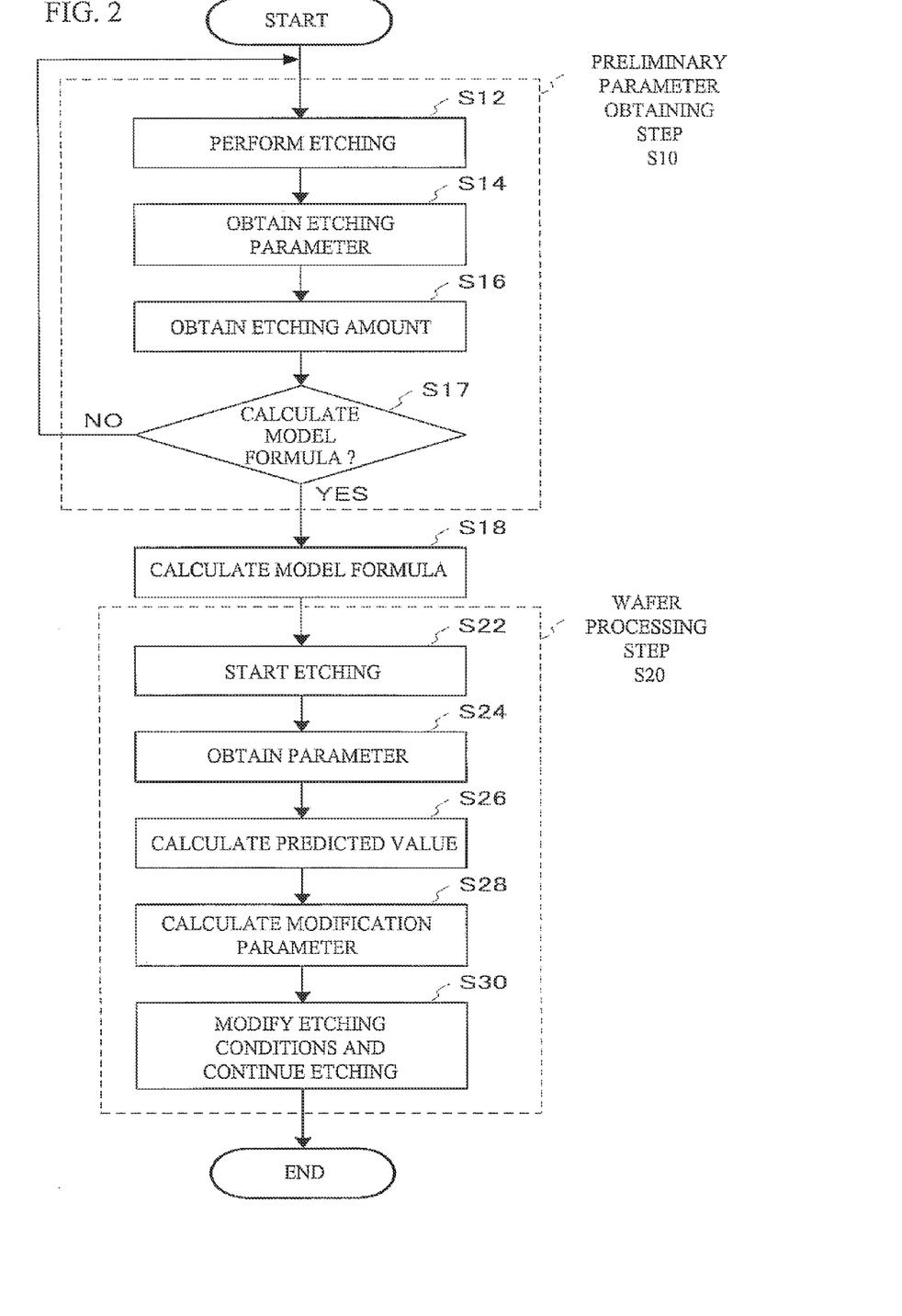
FIG. 2 is a flowchart showing a control method of the semiconductor manufacturing apparatus in accordance with an embodiment of the present invention.

Referring to FIG. 1 and FIG. 2, a description will now be given of a control method of the semiconductor manufacturing apparatus by use of the control system thereof in accordance with an embodiment of the present invention. Firstly, the processing portion 12 of the etching apparatus 10 performs the etching process on the wafer (step S12). The parameter obtaining portion 14 obtains the etching parameters (step S14). The etching parameters may include, but are not limited to, the parameters to be used in the model formula, described below. The parameter obtaining portion 14 outputs a recognition numeral of the wafer that has been etched and the etching parameters to the arithmetic device 30. The arithmetic device 30 stores the etching parameters in the memory device 55 in association with the wafer recognition numeral. The etching amount measuring device 50 measures the etching amount of the wafer that has been etched by the processing portion 12 of the etching apparatus 10 (step S16). The etching amount measuring device 50 outputs the recognition numeral of the wafer from which the etching amount is measured and the etching amount, to the arithmetic device 30. The arithmetic device 30 stores the etching amount in the memory device 55 in association with the wafer recognition numeral.

The arithmetic device 30 determines whether the model formula should be calculated (step S17). If yes, processing moves to step S22. If not, processing returns to step S12. In one embodiment, the etching parameters and the etching amounts of more than several tens of etching processes are used for the calculation of the model formula. Accordingly, the arithmetic device 30 is capable of determining whether the model formula should be calculated with the number of the etching processes from which the etching parameters and the etching amounts are obtained. Steps S12 through S17 compose a preliminary parameter obtaining step S10.

At step S18, the arithmetic device 30 calculates the model formula expressing the etching amount as an etching parameter, by use of the etching amount and the etching parameter stored in the memory device 55 (step S18). The model formula is calculated by performing the multivariable analysis, with the etching parameter set to explanatory variable and the etching amount set to objective variable. It is appreciated that many different types of multivariable analysis may be employed, such as multiple regression analysis, principal-component regression, partial least squares (PLS) regression, or the like. The arithmetic device 30 outputs the model formula to the operation portion 16 of the etching apparatus 10. The operation portion 16 stores the model formula in the memory portion 22. The model formula, for example, represents the etching amount by a linear expression of the etching parameters. When the etching parameters are substituted for the model formula, the predicted value of the etching amount obtained in consequence of the etching process is obtainable.

The processing portion 12 of the etching apparatus 10 starts etching process on the wafer (step S22). The parameter obtaining portion 14 obtains the etching parameters from the processing portion 12 and outputs the etching parameters to the predicted value calculating portion 17 of the operation portion 16 (step S24). The predicted value calculating portion 17 obtains the model formula from the memory portion 22 and calculates the predicted value of the etching amount by use of the model formula and the etching parameters (step S26). The predicted value calculating portion 17 outputs the predicted value to the parameter calculating portion 18. The parameter calculating portion 18 obtains the target value of the etching amount from the memory portion 22. With the predicted value obtained from the predicted value calculating portion 17 and the target value, the etching time is calculated so that the etching amount is equal to the target value (step S28). The parameter calculating portion 18 outputs the target etching time to the controlling portion 20. The controlling portion 20 modifies the etching time during the etching process based on the etching time calculated by the parameter calculating portion 18 and causes the processing portion 12 to perform the etching process (step S30). Next, the etching process is completed. In this manner, step S22 through S30 compose a wafer processing step S20 and are performed while the processing portion 12 is etching the identical wafer.

Figure 3:
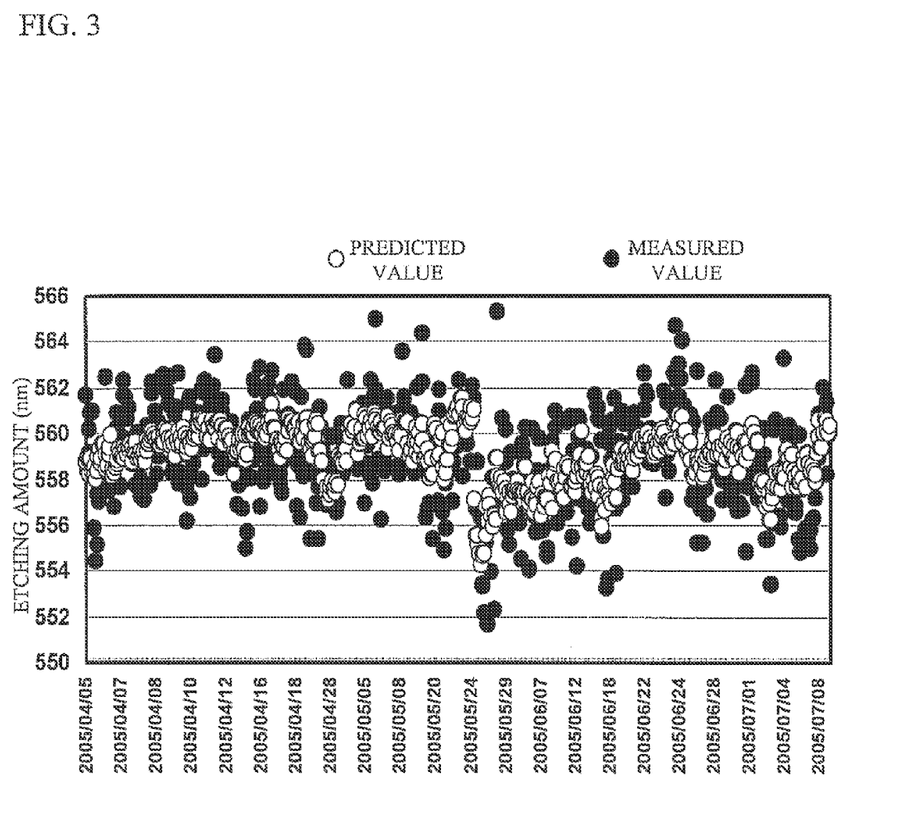
FIG. 3 shows the etching amount changing over the time.

FIG. 3 shows the etching amount changing over the time, in accordance with one embodiment of the present invention. Black circles represent the measured values of the etching amount, and white circles represent the predicted values of the etching amount by use of the etching parameters and the model formula. Referring to FIG. 3, the measured values of the etching amount are varied in a short range. If the etching process is performed by calculating the etching time based on the measured values of the past, the etching amount is varied in consequence of the variation in a short range. Meanwhile, as the etching amount is predicted from the model formula and the etching parameters, the variation in a short range is reduced.

In one embodiment, the parameter obtaining portion 14 (first parameter obtaining portion) obtains multiple etching parameters (processing parameters) with the use of the etching apparatus 10 at step S14. At step S16, the etching amount measuring device 50 (target parameter obtaining portion) obtains the etching amount (i.e., the target parameter) of the wafer on which the etching process has been performed with multiple etching parameters by the etching apparatus. At step S18, the arithmetic device 30 (model formula calculating portion) performs the multiple classification analysis with such obtained multiple etching parameters as the explanatory variable and the etching amount as the objective variable so as to calculate the model formula expressing such obtained multiple etching parameters by DC bias, He leak amount, the capacitor value of the matching circuit, and the etching time (selected parameter), which are one or more of the multiple etching parameters. That is to say, the arithmetic device 30 performs the multiple classification analysis with multiple processing parameters and the target parameters to calculate the model formula.

At step S24, the parameter obtaining portion 14 (second parameter obtaining portion) obtains the DC bias, He leak amount, the capacitor value of the matching circuit, and the etching time (selected parameter) of the etching process performed by the etching apparatus while the processing portion 12 is performing the etching process. At step S26, the predicted value calculating portion 17 calculates the predicted value of the etching amount of the wafer obtained by performing the etching process by use of the model formula and the selected parameter, while the etching process is being performed. At step S28, while the etching process is being performed, the parameter calculating portion 18 (modification parameter calculating portion) calculates the value that the etching time is to be modified (modification parameter), which is one of the etching parameters of the etching process performed by the etching apparatus, so that the etching amount is equal to the target value according to the predicted value calculated. At step S30, the processing portion 12 modifies the etching time (modification parameter) of the etching process being performed by the above-calculated value and continues the etching process.

As stated, the model formula expressing the etching amount in the etching parameters is calculated by use of the etching parameters and the etching amount, obtained in advance, of the etching apparatus. Then, while the etching process is being performed, the etching parameters of the current etching process are obtained. The predicted value of the etching amount is calculated and the etching time is calculated with the predicted value. The etching process is performed, after the etching time of the etching process being performed is modified to such calculated etching time. By this method, it is possible to reduce the effect of the etching amount varied in a short range and to keep the etching amount within a desired range.

In one embodiment, the etching time is calculated so that the predicted value of the etching amount is equal to the target value of the etching amount (step S28). This permits the etching amount to be closer to the target value. Also, at step S28 and step S30, the modification parameter may be set to the etching time, the modification parameter being a parameter to modify the condition of the etching parameter during the etching process, the etching time being the time to perform the etching process. By changing the etching time and performing the etching process, the etching amount can be modified with ease without changing the etching parameter, which is difficult to modify. In addition, the operation portion 16 and the memory portion 22 may be respectively included in the arithmetic device 30 and the memory device 55.

Figure 4:
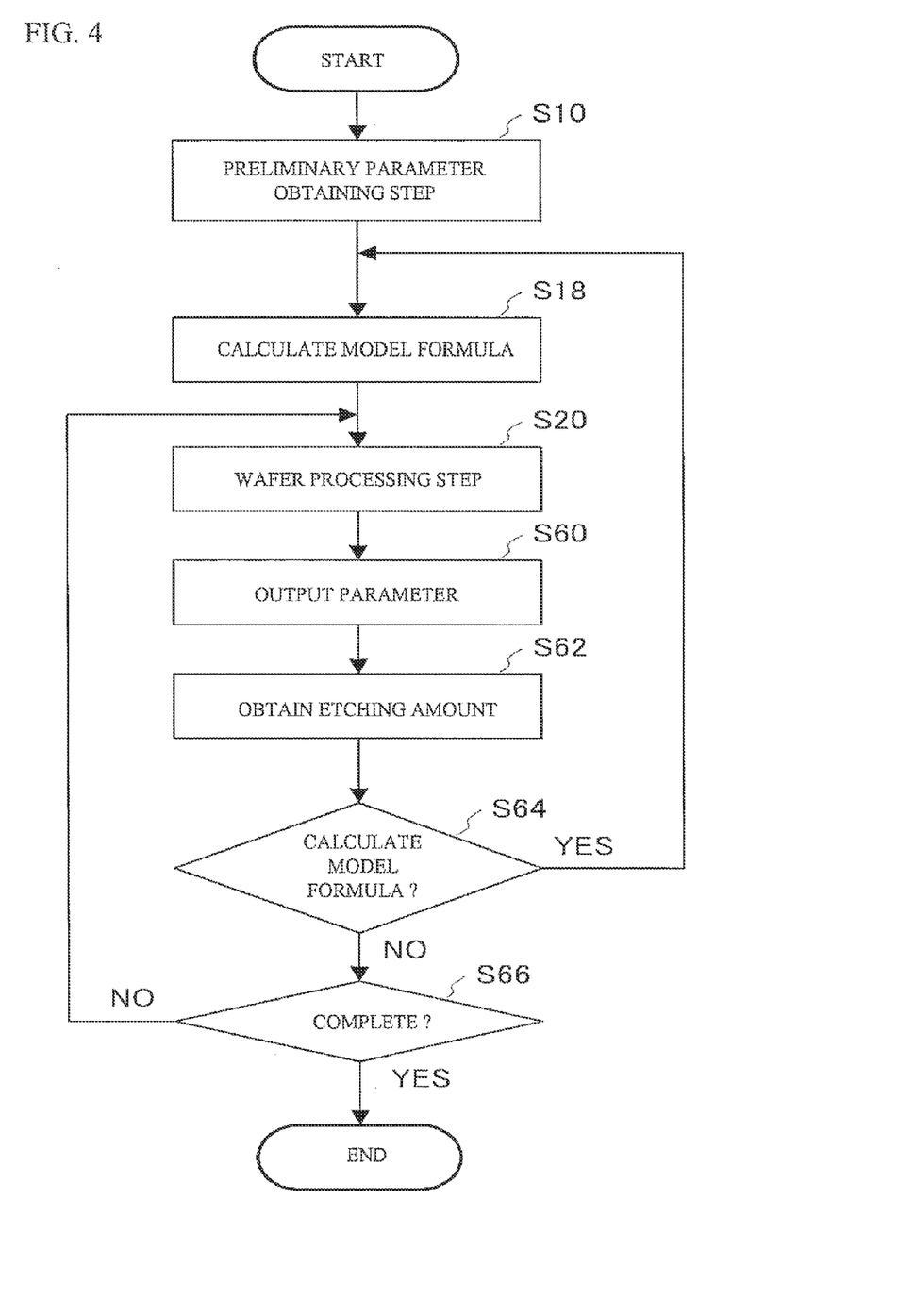
FIG. 4 is a flowchart showing a control method of the semiconductor manufacturing apparatus employed in an embodiment of the present invention.

One embodiment involves calculating the model formula every time the wafer processing step S20 is performed, in addition to the processes described above. FIG. 4 shows a control method of the control system employed in the second embodiment. It is appreciated that FIG. 4 contains some of the same elements as FIG. 1. As such, detailed descriptions of these elements can be found above are omitted in the present discussion.

In a similar manner as FIG. 2 described above, the preliminary parameter obtaining step (step S10), calculation of the model formula (step S20), and the wafer processing step (step S20) are performed. The parameter obtaining portion 14 outputs the etching parameter obtained at the wafer processing step S20 together with the identification numeral of the wafer on which the etching process is performed, to the arithmetic device 30 (step S60). The arithmetic device 30 stores the etching parameter together with the identification numeral in the memory device 55. The etching amount measuring device 50 measures the etching amount of the wafer, and outputs the etching amount together with the identification numeral to the arithmetic device 30 (at step S62). The arithmetic device 30 stores the etching amount together with the identification numeral in the memory device 55. The measurement of the etching amount may be performed with respect to all the wafers, but may also be performed at random.

The arithmetic device 30 determines whether the model formula is calculated (step S64). The arithmetic device 30 determines whether the model formula should be calculated based on the number of times that the etching apparatus 10 performs the etching process and the period since the etching apparatus 10 calculates the model formula last time. If it is not to be calculated, the arithmetic device 30 determines whether the etching process is finished (step S66). If it is Yes at step S66, the etching process is finished. If it is No, processing goes to step S20 and the processing portion 12 performs the etching process of the next wafer. If, at step S64, the model formula is to be calculated, processing goes to step S18 and the arithmetic device 30 calculates the model formula again. Here, when the model formula is calculated again, the etching parameter and the etching amount used for the calculation may employ not only the etching parameters and the etching amount obtained at the preliminary parameter obtaining step S10 but also those obtained subsequently. Also, the model formula may be calculated by use of the etching parameters and the etching amount during a given period of the past or of those of a given number of the times of the etching process.

The etching amount calculated in the model formula may be different from that actually measured over the time. This is because the etching amount is influenced by the modification in the parameter other than the selected etching parameter or by the modification in the parameter of another semiconductor manufacturing apparatus. Accordingly, in one embodiment, the etching amount of the wafer on which the etching process is performed at step S20 is obtained (step S62). Step S20 and step S62 are performed several times, before the model formula calculation of step S18 is performed again. In this manner, the latest model formula is calculated on a regular basis, and the etching time can be modified with the model formula. This makes it possible to suppress the etching amount from deviating from the desired range over the time because of the variation factor in a wide range.

Figure 5:
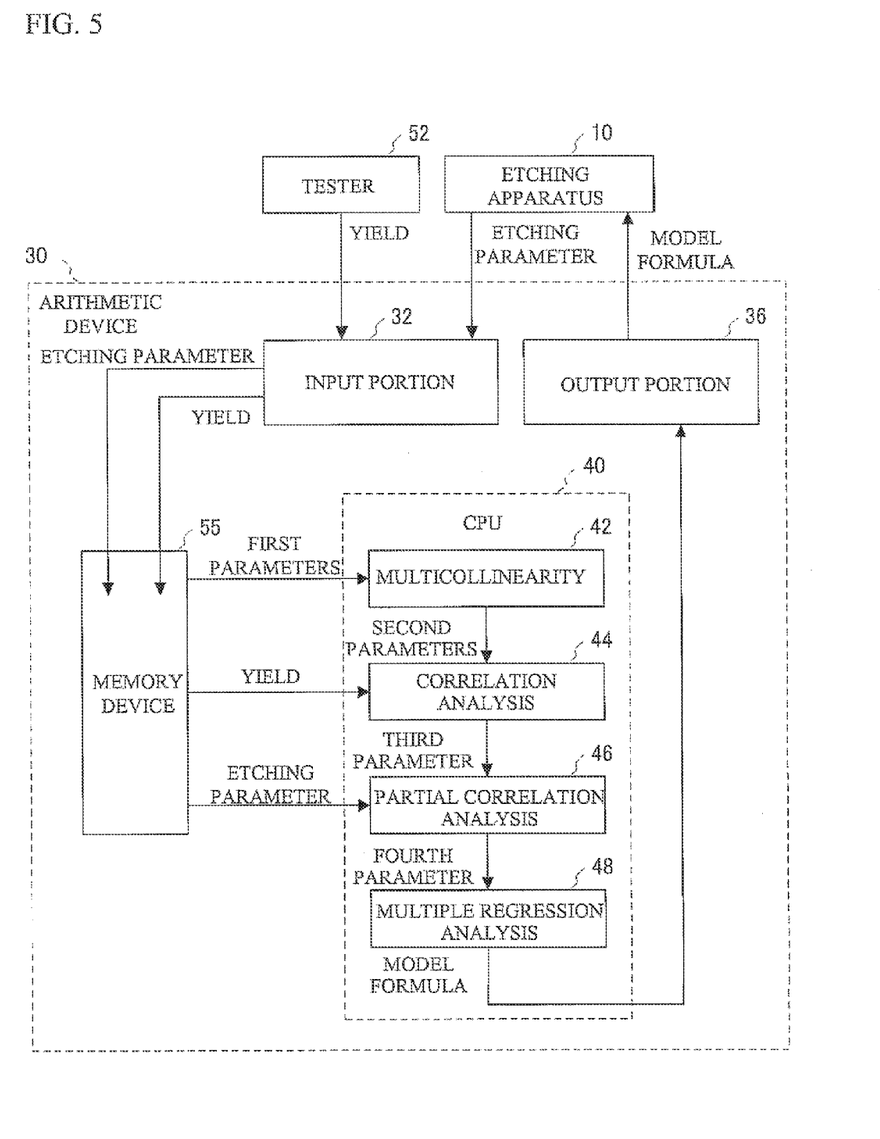
FIG. 5 is a block diagram of a control system of the semiconductor manufacturing apparatus in accordance with an embodiment of the present invention.

One embodiment is an example of a control system and a control method of the semiconductor manufacturing apparatus, in which the etching apparatus is employed for the semiconductor manufacturing apparatus, the etching process is performed on the wafer, and the target parameter is the yield of the semiconductor devices formed in the wafer. FIG. 5 is a block diagram of the control system of the semiconductor manufacturing apparatus in accordance with one embodiment of the present invention. In the etching apparatus 10, the same components and configurations as those shown in FIG. 1 and described above have the same reference numerals and a detailed explanation will be omitted. Instead of the etching amount measuring device 50 shown in FIG. 1, a tester 52 is employed to measure the yield of the semiconductor devices. The arithmetic device 30 includes: an input portion 32; the memory device 55; a CPU 40; and an output portion 36.

Figure 6:
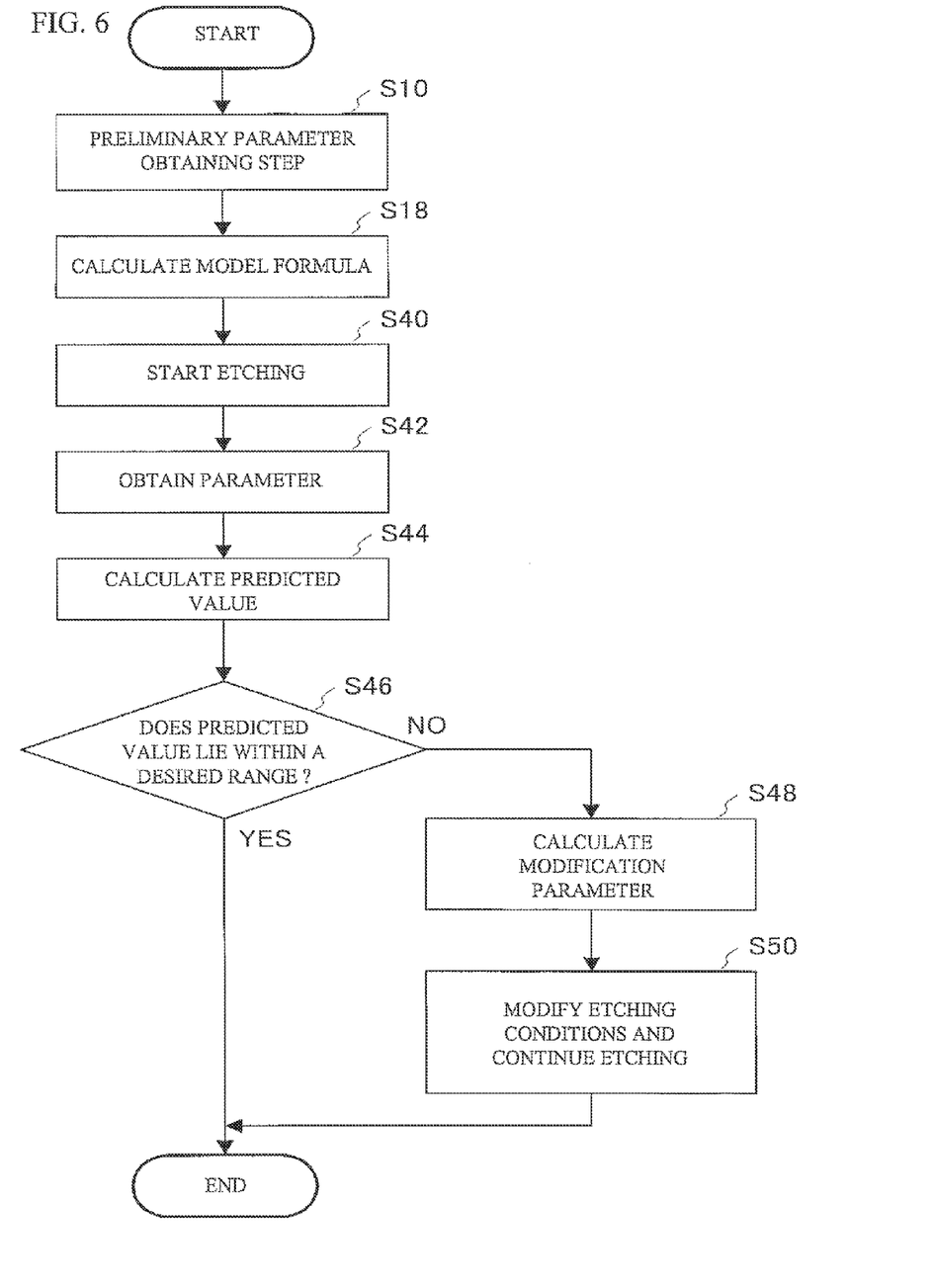
FIG. 6 is a flowchart showing a control method of the semiconductor manufacturing apparatus employed in an embodiment of the present invention.

With reference to FIG. 6, a description will now be given of a control method of the semiconductor manufacturing apparatus employed in one embodiment. The preliminary parameter obtaining step S10 is performed in a similar manner as shown in FIG. 2 described above. Here, at step S16 of FIG. 2, the tester 52 examines the yield instead of the etching amount measuring device employed in the first embodiment, and outputs the yield to the arithmetic device 30. The arithmetic device 30 calculates the model formula (step S18). The processing portion 12 of the etching apparatus 10 starts the etching process of the wafer (step S40). The parameter obtaining portion 14 obtains the etching parameters, with which the etching process is being performed, and outputs the etching parameters to the predicted value calculating portion 17 of the operation portion 16 (step S42). The predicted value calculating portion 17 obtains the model formula from the memory portion 22, and calculates the predicted value of the yield of the wafer with the model formula and the etching parameters (step S44). The predicted value calculating portion 17 outputs the predicted value to the parameter calculating portion 18. The parameter calculating portion 18 obtains the desired range of the yield from the memory portion 22. The parameter calculating portion 18 determines whether the predicted value of the yield lies within in the desired range of the yield (step S46). If it is Yes, processing ends as the etching process completes. If it is No, the value to be modified of the parameter to be modified (modification parameter) is calculated out of the etching parameters, so that the yield lies within the desired range (step S48). The controlling portion 20 modifies the value of the modification parameter to such calculated value, and causes the processing portion 12 to keep performing the etching process on the wafer (step S50).

In one embodiment, at step S48, if the predicted value of the yield lies outside a given range, the parameter calculating portion 18 calculates the value to be modified of the modification parameter so that the predicted value of the yield is equal to the target value within the desired range. Then, the processing portion 12 continues performing the etching process with such modified modification parameter, which is the modification parameter modified to the value to be modified. If the modification parameter is not the etching parameter that can be controlled directly at the controlling portion 20, the controlling portion 20 needs to implement a complicated control. As stated, if it is difficult to control the parameter to be modified during the etching process, it is preferable that the parameter should be modified when the predicted value of the yield lies outside a given range. This makes it possible to reduce the possibility of an error caused by the unstable control of the modification parameter, without changing the modification parameter every etching process.

One embodiment is an example of calculating the model formula at step S18 described above, in which the etching apparatus is employed for the semiconductor manufacturing apparatus, the etching process is performed on the wafer, and the yield of the semiconductor devices formed in the wafer is set as the target parameter. The etching apparatus 10 is an apparatus used for etching a gate stack (floating gate and control gate formed of polysilicon) of a flash memory, and the yield of the semiconductor devices is measured when the flash memory is tested with the tester 52 subsequent to the formation of the flash memory on the wafer. The etching parameters used in the model formula include, but are not limited to: DC bias applied to the lower electrode of the etching apparatus 10; a lower electrode power reflection and an upper electrode power reflection, which are powers respectively reflecting from the lower electrode and the upper electrode of RF power; and an upper electrode supplying potential maximum value, which is a maximum potential of RF power to be supplied to the upper electrode.

In one embodiment, the control system of the semiconductor manufacturing apparatus employs a system as shown in FIG. 5. Referring to FIG. 5, the CPU 40 performs a multicollinearity 42, a correlation analysis 44, a partial correlation analysis 46, and a multiple regression analysis 48.

Figure 7:
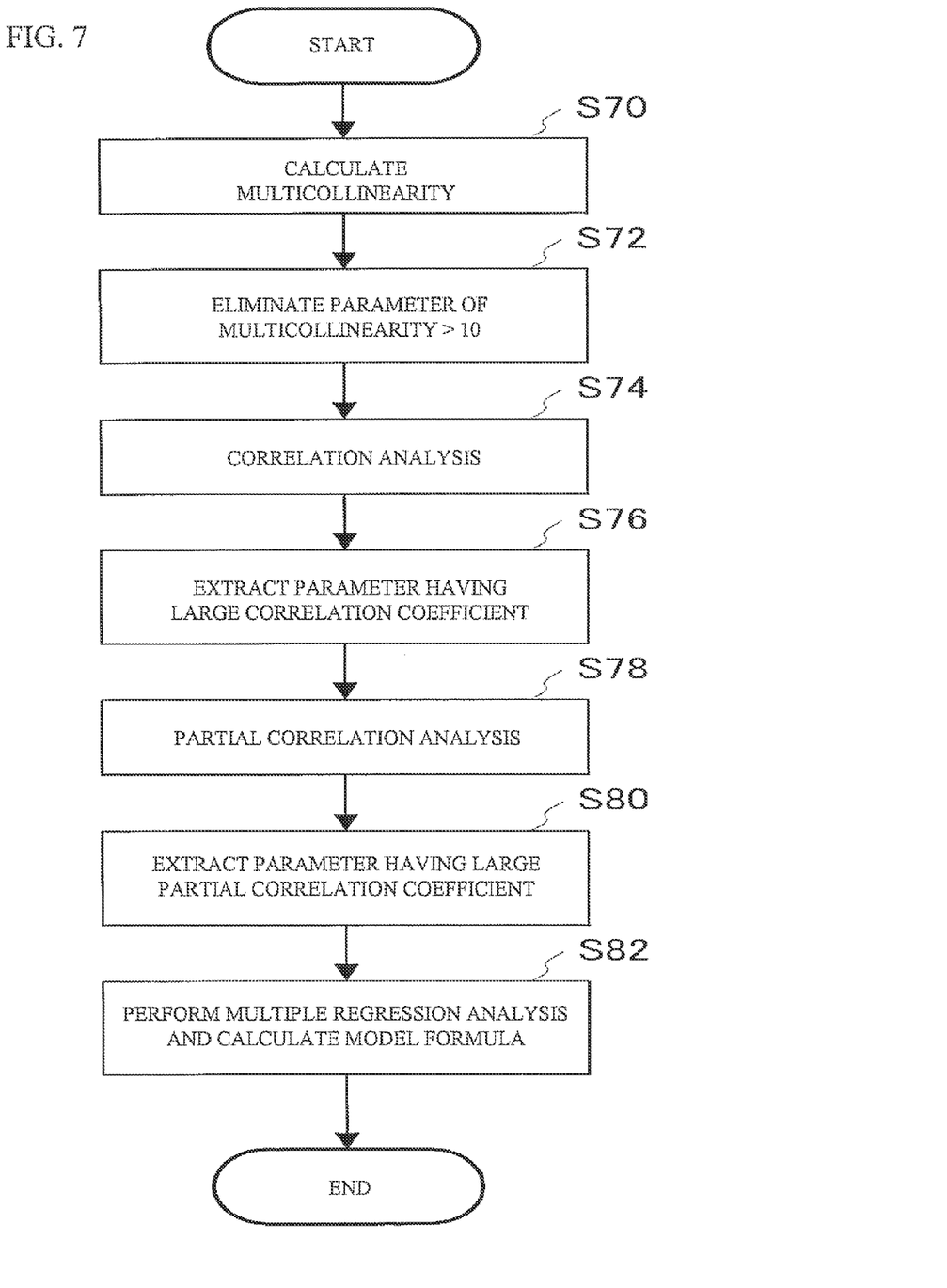
FIG. 7 is a flowchart showing a control method of the semiconductor manufacturing apparatus employed in an embodiment of the present invention.

A description will be given, with reference to the flowchart of FIG. 7, of the calculation of the model formula performed by the arithmetic device 30. In the fourth embodiment, the arithmetic device 30 calculates the model formula by use of 73 parameters as the etching parameters. Prior to the process flow of FIG. 7, the etching parameters of the time when the etching apparatus 10 performs the etching process on the wafer and the yield of the wafer measured by the tester 52 are stored in the memory device 55. Firstly, the CPU 40 obtains the 73 etching parameters, obtained at the time when multiple wafers are etched, from the memory device 55. The aforedescribed etching parameters are set to first parameters. The CPU 40 calculates the multicollinearity among the 73 first parameters (step S70). That is to say, dispersed intensity factors between each of the first parameters are calculated. 72 dispersed intensity factors are respectively obtainable for each of the first parameters. The CPU 40 sets the first parameters to second parameters except the first parameter having the dispersed intensity factor of 10 or more, if there is any in the 72 dispersed intensity factors. In other words, the CPU 40 eliminates any parameter having at least a given value of multicollinearity from the first parameters, and sets the first parameters to the second parameters (step S72).

Next, the CPU 40 obtains the yield from the memory device 55. The CPU 40 performs the correlation analysis with the second parameters set to explanatory variable and the yield set to the objective variable to calculate the correlation function. That is to say, the correlation function between each of the second parameters and the yield is calculated (step S74). One correlation function is respectively calculated with respect to each of the second parameters. The CPU 40 extracts the largest correlation function with respect to the yield to set a third parameter (step S76). In one embodiment, among the second parameters, the DC bias has a correlation function of 0.633, which is the largest. Therefore, the DC bias is extracted to be set to the third parameter. The third parameter is not limited to one. A given number of the second parameters in descending order of the correlation function may be set as the third parameters.

The CPU 40 calculates a partial correlation function with the DC bias of the third parameter set to the objective variable and the second parameters except the DC bias set to the explanatory variable. That is to say, the partial correlation functions of the third parameter and the second parameters are calculated (step S78). For each of the second parameters, the partial correlation functions equal to the number of the third parameters are calculated. The CPU 40 may extract the upper electrode supplying potential maximum value, the power reflection of the lower electrode, and the power reflection of the upper electrode, which are the second parameters and have three largest partial correlation functions, to set to fourth parameters (step S80). The fourth parameter is not limited to three. A given number in descending order of the partial correlation functions may be set to the fourth parameters.

The CPU 40 performs the multiple regression analysis with the DC bias of the third parameter and the upper electrode supplying potential maximum value, the power reflection of the lower electrode, and the power reflection of the upper electrode of the fourth parameters set to the explanatory functions and the yield set to the objective function (step S82). That is to say, the multiple regression analysis is performed between the third and fourth parameters and the target parameter (step S82). In consequence, the CPU 40 calculates the following model formula expressing the yield in the DC bias, the upper electrode supplying potential maximum value, the power reflection of the lower electrode, and the power reflection of the upper electrode, $$Y=0.80 \times DC-1.69 \times RR13+4.48 \times RR23-0.12 \times \text{Peak}+457.89,$$

where Y represents the yield, DC represents the DC bias, RR13 represents the power reflection of the lower electrode, RR23 represents the power reflection of the upper electrode, and Peak represents the upper electrode supplying potential maximum value. In one embodiment, the multiple correlation coefficient of the model formula is equal to 0.84.

Figure 8:
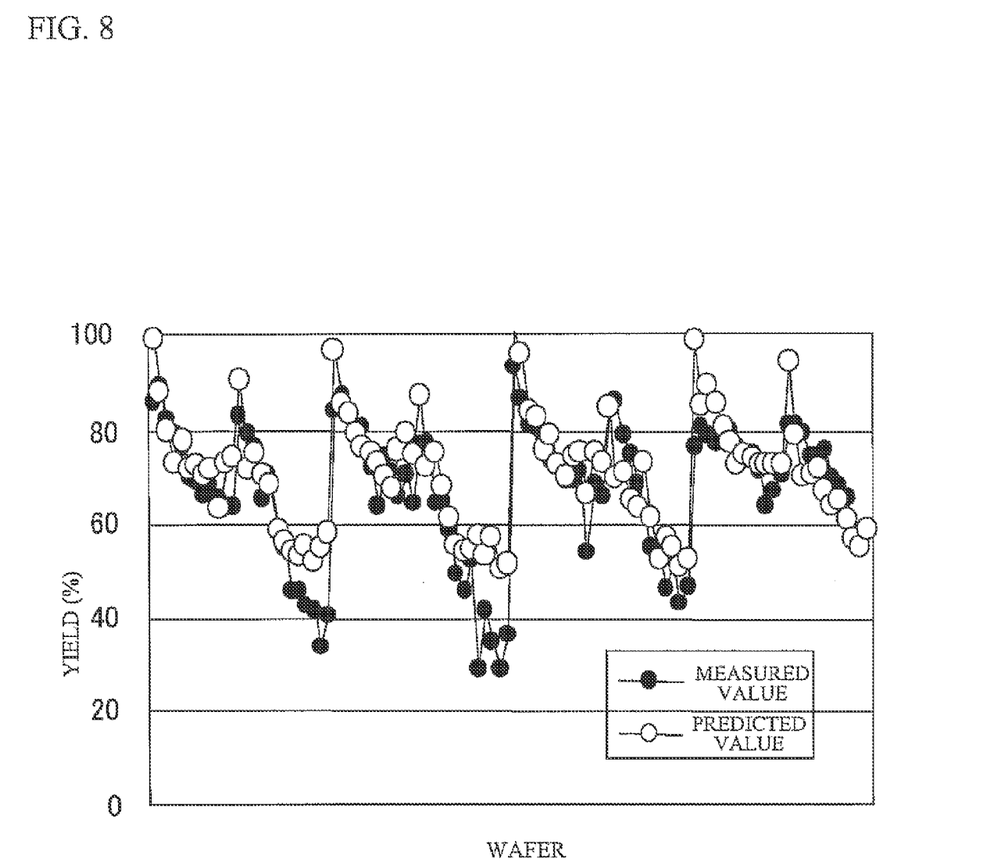
FIG. 8 shows predicted yield of a wafer by use of a model formula calculated by the control method of the semiconductor manufacturing apparatus employed an embodiment of the present invention.

FIG. 8 shows the measured yield (measured value) of the wafer with which the model formula is calculated and the yield (predicted value) calculated with the model formula, in accordance with an embodiment of the present invention. This model formula demonstrates the accurate prediction of the yield. In this manner, in one embodiment, it is possible to calculate the model formula that can calculate the yield with accuracy. By employing the calculation method of the model formula in the calculation of the model formula at step S18 described above, the calculation accuracy of the predicted value of the target parameter is enhanced. This makes it easy to maintain the target parameter within a desired range. In addition to the control system of the semiconductor manufacturing apparatus described above, the calculation method of the model formula may be used for predicting the target parameter from the processing parameters.

A description has been given above with the etching apparatus used as the semiconductor manufacturing apparatus and the etching process used as the process. However, it should be appreciated that embodiments may be applied to the process performed by another semiconductor manufacturing apparatus. For example, embodiments may be applied to the thin film formation process on the wafer by use of a thin film forming apparatus, the impurities introduction process such as ion implantation or the like, by use of an ion implanter, the thermal treatment by use of a thermal treatment equipment, the exposure and development process by use of a lithography apparatus and a development apparatus, and the like. Also, a description has been given of the etching amount and yield used as the target parameter. However, it should be appreciated that embodiments may employ another parameter. For example, the shift amount of etching, cross-sectional shape, film thickness of the thin film, warpage amount of the wafer, size, film characteristic of the thin film, resistance value, capacitance value, transistor characteristic, and the like.

Finally, various aspects of the present invention are summarized in the following.

According to one aspect of the present invention, there is provided a method of controlling a semiconductor manufacturing apparatus including: obtaining a plurality of processing parameters that are processing conditions of the semiconductor manufacturing apparatus to process a wafer; obtaining a target parameter that is measured from the wafer processed with the plurality of processing parameters; performing a multiple classification analysis with the plurality of processing parameters and the target parameter to calculate a model formula expressing the target parameter in a selected parameter that is one or more of the plurality of processing parameters; obtaining the selected parameter of a processing while the processing is being performed by the semiconductor manufacturing apparatus; calculating a predicted value of the target parameter of the wafer being processed by use of the model formula and the selected parameter, while the processing is being performed; calculating a value to be modified of a modification parameter, the modification parameter being one or more of the plurality of processing parameters of the processing being performed by the semiconductor manufacturing apparatus on the basis of the predicted value, while the processing is being performed; and performing the processing continuously by use of the value to be modified of the modification parameter.

In the above-described method, calculating the value to be modified of the modification parameter may include calculating the value to be modified of the modification parameter so that the predicted value is equal to a target value of the target parameter. It is possible to make the target parameter closer to a desired value.

In the above-described method, calculating the value to be modified of the modification parameter may include calculating the value to be modified of the modification parameter so that the predicted value is equal to a target value of the target parameter in a case where the predicted value lies outside a given range. It is possible to keep the target parameter within the desired range.

The above-described method may further include: obtaining the target parameter from the wafer processed by performing the processing continuously; and calculating the model formula after the target parameter is obtained. It is possible to suppress the target parameter from deviating from the desired range over the time, because of the changing factor.

In the above-described method, calculating the model formula may include: calculating a multicollinearity of first parameters that are the plurality of processing parameters to set to second parameters, the first parameters except a parameter having more than a given value of the multicollinearity; calculating correlation coefficients between the second parameters and the target parameter to set to a third parameter, a given number of the second parameters in descending order of the correlation coefficients; calculating partial correlation coefficients between the third parameter and the second parameters to set to a fourth parameter, a given number of the second parameters in descending order of the partial correlation coefficients; and performing a multiple regression analysis between the third parameter and the forth parameter and the target parameter to calculate the model formula expressing the target parameter in the third parameter and the forth parameter. It is possible to employ the model formula that can calculated the target parameter with accuracy, thereby keeping the target parameter within the desired range with ease.

In the above-described method, the modification parameter may be a time to perform the processing. It is possible to control the target parameter within the desired range with ease.

In the above-described method, the target parameter may be a yield of semiconductor devices formed in the wafer. It is possible to directly maintain the yield of the semiconductor devices within a desired range.

According to one of the present invention, there is provided a controlling system of a semiconductor manufacturing apparatus including: a processing portion processing a wafer; a first parameter obtaining portion obtaining a plurality of processing parameters that are processing conditions of the processing portion in processing the wafer; a target parameter obtaining portion obtaining a target parameter that is measured from the wafer processed with the plurality of processing parameters; a model formula calculating portion calculating a model formula expressing the target parameter in a selected parameter that is one or more of the plurality of processing parameters by performing a multiple classification analysis with the plurality of processing parameters and the target parameter; a second parameter obtaining portion obtaining the selected parameter by the processing portion, while a processing is being performed by the processing portion; a predicted value calculating portion calculating a predicted value of the target parameter of the wafer being processed with the model formula and the selected parameter, while the processing is being performed; and a modification parameter calculating portion calculating a value to be modified of a modification parameter based on the predicted value, the modification parameter being one or more of the plurality of processing parameters of the processing being performed by the processing portion, while the processing is being performed. The processing portion performs the processing continuously by use of the value to be modified of the modification parameter.

According to one aspect of the present invention, there is provided a semiconductor manufacturing apparatus including: a processing portion processing a wafer; a second parameter obtaining portion obtaining a selected parameter, which is one or more of a plurality of processing parameters that are processing conditions of the processing portion, while a processing is being performed by the processing portion; a predicted value calculating portion calculating a predicted value of a target parameter of the wafer being processed with a model formula and the selected parameter, the model formula expressing in the target parameter measured from the wafer processed by the processing portion, while the processing is being performed; and a modification parameter calculating portion calculating a value to be modified of a modification parameter on the basis of the predicted value, the modification parameter being one or more of the plurality of processing parameters of the processing being performed by the processing portion, while the processing is being performed. The processing portion performs the processing continuously by use of the value to be modified of the modification parameter.

According to one aspect of the present invention, there is provided a method of controlling a semiconductor manufacturing apparatus including: calculating a multicollinearity of first parameters that are processing conditions to process a wafer by use of the semiconductor manufacturing apparatus to set to second parameters, the first parameters except a parameter having more than a given value of the multicollinearity; calculating correlation coefficients between the second parameters and a target parameter that is measured from the wafer processed with the first parameters by use of the semiconductor manufacturing apparatus to set to a third parameter, a given number of the second parameters in descending order of the correlation coefficients; calculating partial correlation coefficients between the third parameter and the second parameters to set to a fourth parameter, a given number of the second parameters in descending order of the partial correlation coefficients; and performing a multiple regression analysis between the third parameter and the fourth parameter and the target parameter to calculate the model formula expressing the target parameter in the third parameter and the forth parameter.

Although a few preferred embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A method of controlling a semiconductor manufacturing apparatus comprising:
   obtaining a plurality of processing parameters for processing a wafer, wherein the processing parameters comprise processing conditions of the semiconductor manufacturing apparatus, and wherein the processing parameters further comprise at least one of a DC bias level applied to an electrode of the semiconductor manufacturing apparatus, an He leak amount at a time of chucking the wafer, and a capacitor value in a matching circuit for RF power;
   obtaining a target parameter that is measured from the wafer processed with the plurality of processing parameters;
   performing a multiple classification analysis with the plurality of processing parameters and the target parameter to calculate a model formula expressing the target parameter in a selected parameter that is one or more of the plurality of processing parameters;
   obtaining the selected parameter of a processing while the processing is being performed by the semiconductor manufacturing apparatus;
   calculating a predicted value of the target parameter of the wafer being processed by use of the model formula and the selected parameter, while the processing is being performed;
   calculating a value to be modified of a modification parameter, the modification parameter being one or more of the plurality of processing parameters of the processing being performed by the semiconductor manufacturing apparatus on the basis of the predicted value, while the processing is being performed; and
   performing the processing continuously by use of the value to be modified of the modification parameter.

2. The method as claimed in claim 1, wherein calculating the value to be modified of the modification parameter includes calculating the value to be modified of the modification parameter so that the predicted value is equal to a target value of the target parameter.

3. The method as claimed in claim 1, wherein calculating the value to be modified of the modification parameter includes calculating the value to be modified of the modification parameter so that the predicted value is equal to a target value of the target parameter in a case where the predicted value lies outside a given range.

4. The method as claimed in claim 1, further comprising:
   obtaining the target parameter from the wafer processed by performing the processing continuously; and
   calculating the model formula after the target parameter is obtained.

5. The method as claimed in claim 1, wherein calculating the model formula includes:
   calculating a multicollinearity of first parameters that are the plurality of processing parameters to set to second parameters, the first parameters except a parameter having more than a given value of the multicollinearity;
   calculating correlation coefficients between the second parameters and the target parameter to set to a third parameter, a given number of the second parameters in descending order of the correlation coefficients;
   calculating partial correlation coefficients between the third parameter and the second parameters to set to a fourth parameter, a given number of the second parameters in descending order of the partial correlation coefficients; and
   performing a multiple regression analysis between the third parameter and the fourth parameter and the target parameter to calculate the model formula expressing the target parameter in the third parameter and the fourth parameter.

6. The method as claimed in claim 1, wherein the modification parameter is a time to perform the processing.

7. The method as claimed in claim 1, wherein the target parameter is a yield of semiconductor devices formed in the wafer.

8. The method as claimed in claim 1, wherein the plurality of processing parameters further comprise an etching time.

9. A controlling system of a semiconductor manufacturing apparatus comprising:
   a processing portion for processing a wafer;
   a first parameter obtaining portion operable to obtain a plurality of processing parameters that are processing conditions of the processing portion in processing the wafer, wherein the processing parameters comprise at least one of a DC bias level applied to an electrode of the semiconductor manufacturing apparatus, an He leak amount at a time of chucking the wafer, and a capacitor value in a matching circuit for RF power;
   a target parameter obtaining portion operable to obtain a target parameter that is measured from the wafer processed with the plurality of processing parameters;
   a model formula calculating portion operable to calculate a model formula expressing the target parameter in a selected parameter that is one or more of the plurality of processing parameters by performing a multiple classification analysis with the plurality of processing parameters and the target parameter;
   a second parameter obtaining portion operable to obtain the selected parameter by the processing portion, while a processing is being performed by the processing portion;

a predicted value calculating portion operable to calculate a predicted value of the target parameter of the wafer being processed with the model formula and the selected parameter, while the processing is being performed; and a modification parameter calculating portion operable to calculate a value to be modified of a modification parameter based on the predicted value, the modification parameter being one or more of the plurality of processing parameters of the processing being performed by the processing portion, while the processing is being performed, wherein the processing portion performs the processing continuously by use of the value to be modified of the modification parameter.

10. The controlling system as claimed in claim 9 wherein the modification parameter calculating portion is operable to calculate the value to be modified of the modification parameter so that the predicted value is equal to a target value of the target parameter.

11. The controlling system as claimed in claim 9 wherein the modification parameter calculating portion is operable to calculate the value to be modified of the modification parameter so that the predicted value is equal to a target value of the target parameter in a case where the predicted value lies outside a given range.

12. The controlling system as claimed in claim 9 wherein the target parameter obtaining portion is operable to obtain the target parameter while the processing is being continuously performed, and wherein further the model formula calculating portion is operable to calculate the model formula after the target parameter is obtained.

13. The controlling system as claimed in claim 9 wherein the model formula calculation portion comprises:
a multicollinearity calculating portion for calculating a multicollinearity of first parameters that are the plurality of processing parameters to set to second parameters, the first parameters except a parameter having more than a given value of the multicollinearity;
a correlation coefficient calculating portion for calculating correlation coefficients between the second parameters and the target parameter to set to a third parameter, a given number of the second parameters in descending order of the correlation coefficients, the correlation coefficient calculating portion also for calculating partial correlation coefficients between the third parameter and the second parameters to set to a fourth parameter, a given number of the second parameters in descending order of the partial correlation coefficients; and
a multiple regression analysis portion for performing a multiple regression analysis between the third parameter and the fourth parameter and the target parameter to calculate the model formula expressing the target parameter in the third parameter and the fourth parameter.

14. The controlling system as claimed in claim 9, wherein the modification parameter is a time to perform the processing.

15. The controlling system as claimed in claim 9, wherein the target parameter is a yield of semiconductor devices formed in the wafer.

16. The controlling system as claimed in claim 9, wherein the plurality of processing parameters further comprise an etching time.

17. A semiconductor manufacturing apparatus comprising:
a processing portion for processing a wafer;
a selected parameter obtaining portion operable to obtain a selected parameter, which is one or more of a plurality of processing parameters that are processing conditions of the processing portion, while a processing is being performed by the processing portion, wherein the processing parameters comprise at least one of a DC bias level applied to an electrode of the semiconductor manufacturing apparatus, an He leak amount at a time of chucking the wafer, and a capacitor value in a matching circuit for RF power;
a predicted value calculating portion operable to calculate a predicted value of a target parameter of the wafer being processed with a model formula and the selected parameter, the model formula expressing in the target parameter measured from the wafer processed by the processing portion, while the processing is being performed; and
a modification parameter calculating portion operable to calculate a value to be modified of a modification parameter on the basis of the predicted value, the modification parameter being one or more of the plurality of processing parameters of the processing being performed by the processing portion, while the processing is being performed,
wherein the processing portion performs the processing continuously by use of the value to be modified of the modification parameter.

18. The semiconductor manufacturing apparatus as claimed in claim 17 wherein the modification parameter calculating portion is operable to calculate the value to be modified of the modification parameter so that the predicted value is equal to a target value of the target parameter.

19. The semiconductor manufacturing apparatus as claimed in claim 17 wherein the modification parameter calculating portion is operable to calculate the value to be modified of the modification parameter so that the predicted value is equal to a target value of the target parameter in a case where the predicted value lies outside a given range.

20. The semiconductor manufacturing apparatus as claimed in claim 17 wherein the modification parameter is a time to perform the processing.

21. The semiconductor manufacturing apparatus as claimed in claim 17 wherein the target parameter is a yield of semiconductor devices formed in the wafer.

22. The semiconductor manufacturing apparatus as claimed in claim 17, wherein the plurality of processing parameters further comprise an etching time.

* * * * *